April 30, 1957 — W. H. BOLING — 2,790,418
NECK SUSPENDED TRAMMEL FOR DOGS
Filed Jan. 4, 1956
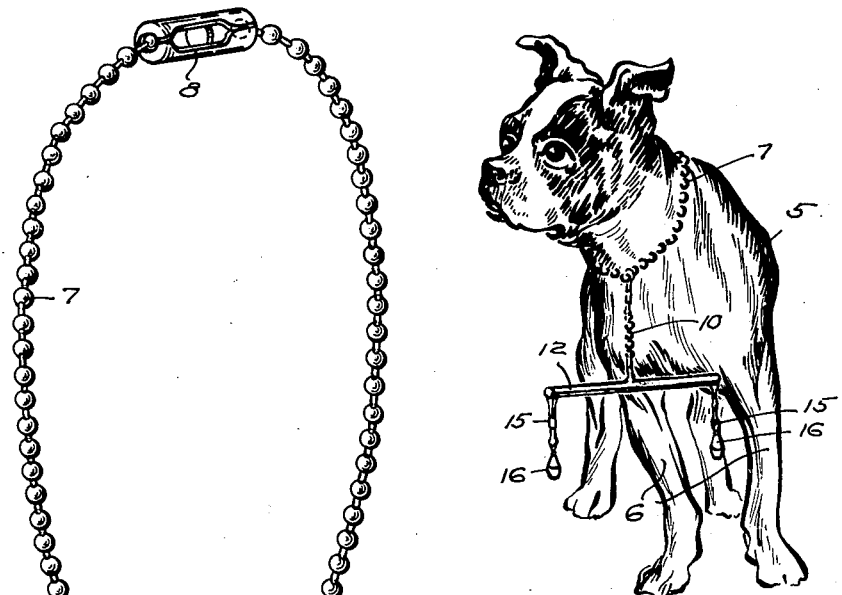
Fig. 1
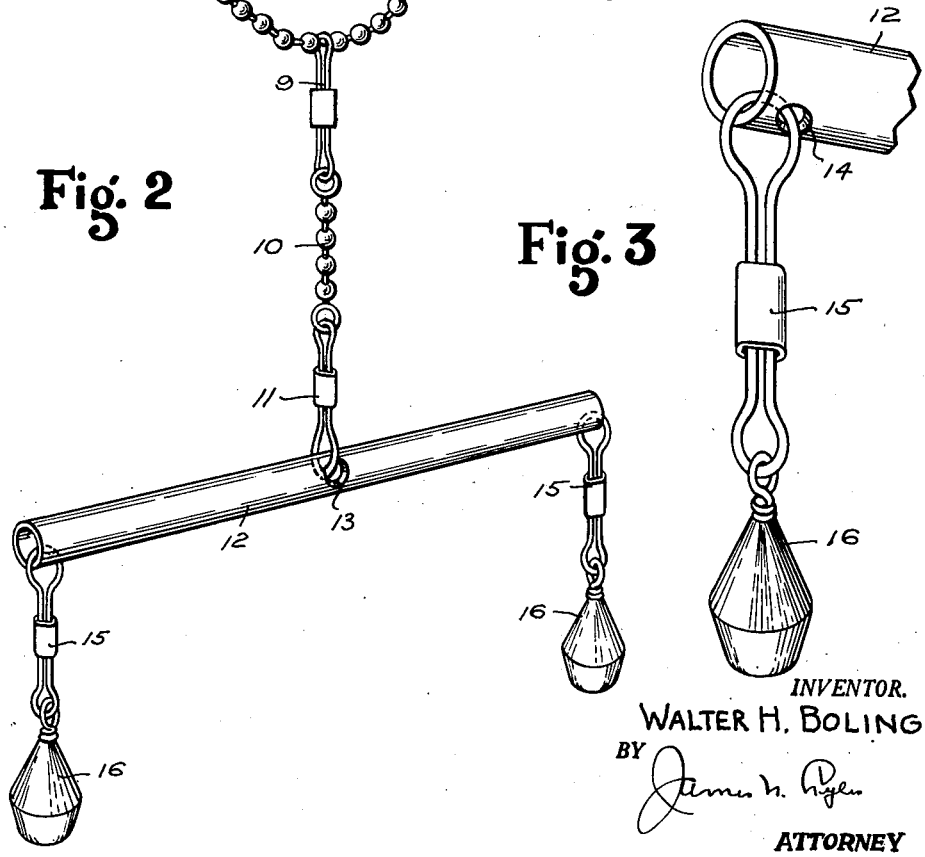
Fig. 2
Fig. 3
INVENTOR.
WALTER H. BOLING,
BY
ATTORNEY

2,790,418
NECK SUSPENDED TRAMMEL FOR DOGS

Walter H. Boling, Miami, Fla., assignor to Dixie Sports, Inc., Miami, Fla.

Application January 4, 1956, Serial No. 557,306

1 Claim. (Cl. 119—107)

My invention relates to a trammel to be applied to the collar of a dog or like animal.

An important object of the invention is to provide a device of the above-mentioned character which will prevent, control or reduce the running movements or the like of the dog.

A further object of the invention is to provide a device of the above-mentioned character which will not unduly harass or inconvenience the dog and will permit of freedom of action within limits.

A further object of the invention is to provide a device of the above-mentioned character which, when in use, will not injure the dog or subject him to pain.

A further object of the invention is to provide a device of the above-mentioned character having elements arranged to engage with the front legs of the dog, to impede or regulate their action and which is adjustable to properly fit dogs of different sizes.

A further object of the invention is to provide weights or balances, for engagement with the front legs of the dog, which may have their weights conveniently adjusted, in accordance with the size or strength of the dog.

Other objects and advantages of the invention will be apparent during the course of the following description.

In the accompanying drawings forming a part of this application and in which like numerals are employed to designate like parts throughout same, Figure 1 is a front view of the trammel, showing the same applied to the dog, Figure 2 is a perspective view of the trammel, Figure 3 is a fragmentary end perspective view of an arm and an associated swinging weight.

In the drawings, where for the purpose of illustration is shown a preferred example of the device, the numeral 5 designates a dog having front legs 6. The dog is provided with a neck encircling collar 7 having an adjustable coupling device 8. The collar 7 is here shown as being a linked chain device of conventional construction. Within the link of the collar 7, there is provided a conventional snap hook 9. The snap hook 9 is of the type that is provided with loops at its opposite ends, as is well known. Connected with the lower end of the hook 9 is a suspension device 10, here illustrated as being a short section of link chain similar to the collar 7. The lower end of the suspension chain 10 is provided with a double end snap hook 11, similar to the hook 9.

The trammel includes a horizontal arm 12, preferably formed of tubular light weight metal, such as aluminum. The arm 12 is open at its opposite ends, for a purpose to be presently described. The arm 12 intermediate its ends is apertured at 13 for the reception of the lower end of the hook 11, whereby the arm will be substantially balanced in a horizontal plane and suspended from the collar 7 to be disposed across the lower portion of the chest of the dog. It is contemplated that the arm 12 shall be formed in various lengths in accordance with the size of the animal upon which it is used so that the opposite ends of the arm terminate in front of the leg portions of the dog. At its opposite ends and preferable upon the bottom of the tube 12, there has been provided apertures 14 for the reception of snap hooks 15, corresponding to the hooks 9 and 11.

Arranged beneath the outer end of the arm 12 and suspended from the lower ends of the hooks 15, are obstruction elements 16 in the form of weighted and preferably solid pendants. The obstruction elements 16 may be formed of any desirable configuration and here illustrated as conical form with their lower ends rounded. The obstruction elements 16 as suspended from the opposite ends of the arm 12 are disposed directly in front of the front legs of the dog 5, clearly shown in Figure 1. The elements 16 may likewise be variable as to weight in accordance with the particular size of animal with which it is used.

In the use of the device, the arm 12 and associated elements are assembled with the collar 7 and then through the medium of the coupling 8, the collar is arranged about the neck of the dog, suspending the arm 12 across the chest of the dog with the elements 16 directly in front of the legs 6. Thus, when the dog attempts to run, his front legs strike against the elements 16 which offer a resistance to the front legs depending upon the weight of the elements. An animal equipped with a trammel of this character will soon learn not to run or move at high speeds and will desist from running after vehicles, scooters and bicycles. The trammel will not unduly restrict the walking or light movements of the dog and is not unduly uncomfortable or in any way painful in use.

It is to be understood from the foregoing that the form of my invention herewith shown and described is to be taken as a preferred form of the invention and that various changes in the shape, size and arrangement of parts may be resorted to, without departing from the spirit of my invention or the scope of the subjoined claim.

Having thus described my invention, I claim:

A trammel for a dog or the like comprising a tubular arm to be generally horizontally arranged in use, said arm being open at its opposite ends, the opposite ends of the arms being apertured, snap hooks engageable with the apertures whereby to be freely swingable, weights carried by the snap hooks whereby the weights are suspended in a manner from the opposite ends of the arm to be independently swingable, the arm intermediate its length being apertured for the reception of a snap hook, a flexible suspension chain engageable with the snap hook, a flexible and adjustable collar for the dog and a snap hook for suspending the flexible suspension device from the collar whereby to dispose the said arm across the chest of the dog and with the weight device being disposed in advance of the legs of the dog.

References Cited in the file of this patent

UNITED STATES PATENTS

| | | |
|---|---|---|
| 858,165 | Edmonds | June 25, 1907 |
| 2,043,410 | Huber | June 9, 1936 |

OTHER REFERENCES

Popular Mechanics, vol. 66, page 598, October 1936.